United States Patent

[11] 3,614,784

| [72] | Inventor | Irving D. Richmond |
| | | Norwalk, Conn. |
| [21] | Appl. No. | 4,005 |
| [22] | Filed | Jan. 19, 1970 |
| [45] | Patented | Oct. 19, 1971 |
| [73] | Assignee | United Aircraft Corporation |
| | | East Hartford, Conn. |

[54] RANGE-GATED MOVING TARGET INDICATOR
20 Claims, 3 Drawing Figs.

| [52] | U.S. Cl. | 343/7.7 |
| [51] | Int. Cl. | G01s 9/42 |
| [50] | Field of Search | 343/7.7 |

[56] References Cited
UNITED STATES PATENTS
3,404,399  10/1968  Eschner.................. 343/7.7

Primary Examiner—T. H. Tubbesing
Attorney—Shenier and O'Connor

ABSTRACT: A range-gated moving target indicator comprises a plurality of sequentially actuated input sampling gates couping a video input to a corresponding plurality of storage capacitors. Each capacitor is coupled to a corresponding band-pass Doppler filter. A plurality of sequentially actuated output sampling gates coupled the Doppler filters to a single full-wave detector, the output of which controls the intensity input of a display device.

3,614,784

1

RANGE-GATED MOVING TARGET INDICATOR

BACKGROUND OF THE INVENTION

In prior art range-gated moving target indicators, the outputs of the plurality of Doppler filters are coupled to a corresponding plurality of amplitude detector circuits. The outputs of the detector circuits are coupled to a corresponding plurality of low-pass filters or integrating circuits. The outputs of the integrating circuits are coupled through sequentially actuated output sampling gates to the intensity input of a display device.

SUMMARY OF THE INVENTION

One object of my invention is to provide a range-gated moving target indicator, wherein the outputs of the Doppler filters are directly applied to the sequentially actuated output sampling gates.

Another object of my invention is to provide a range-gated moving target indicator which employs only one common amplitude detecting circuit.

Other and further objects of my invention will appear from the following description.

BRIEF DESCRIPTION OF THE DRAWINGS

In the accompanying drawings which form part of the instant specification and which are to be read in conjunction therewith and in which like reference numerals are used to indicate like parts in the various views:

FIG. 3 is a fragmentary schematic view showing the details of one of the range-gated channels.

DESCRIPTION OF THE PREFERRED EMBODIMENT

Figure 1:
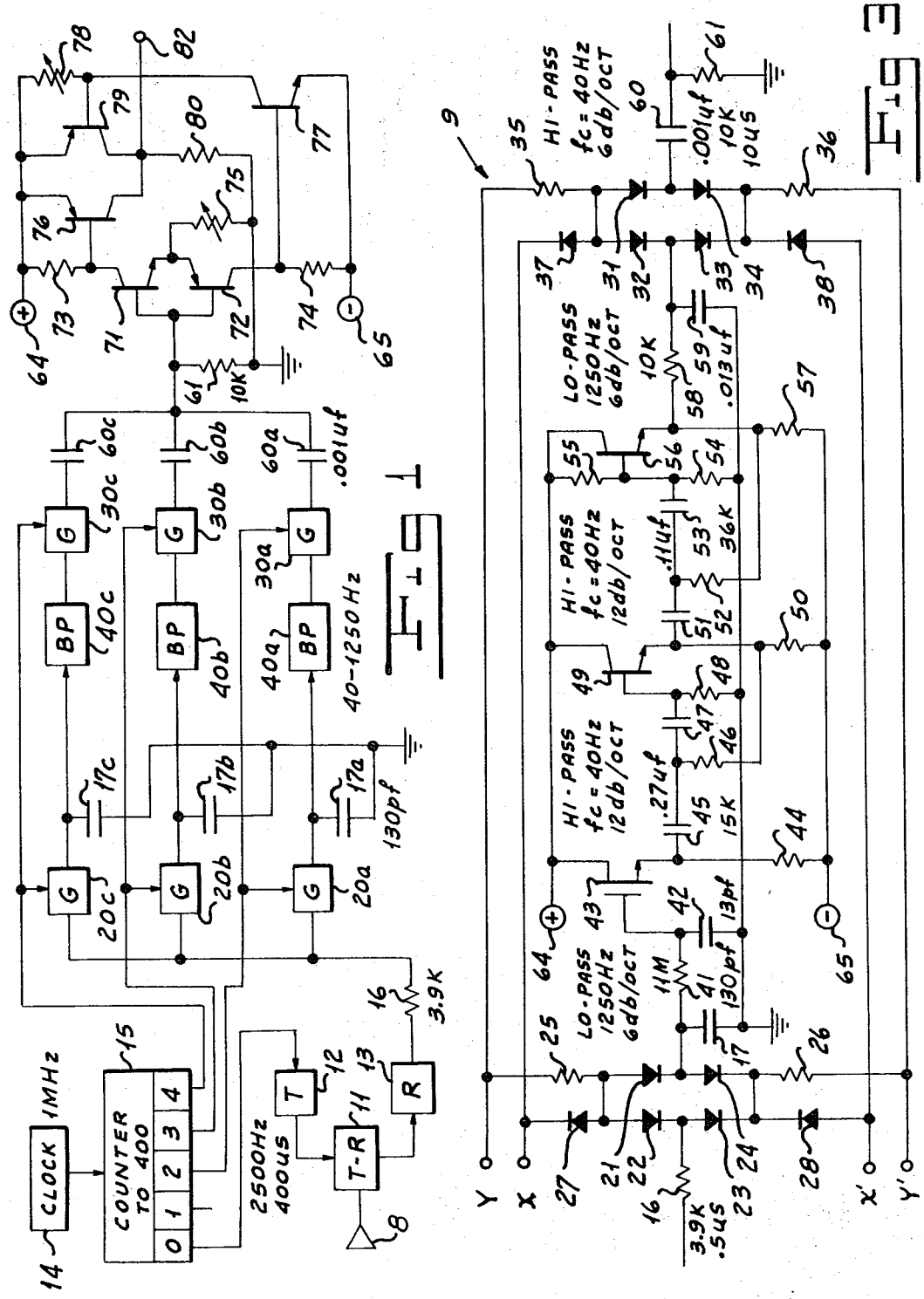
FIG. 1 is a simplified schematic view illustrating a preferred embodiment of my invention.

Referring now more particularly to FIG. 1 of the drawings, an antenna 8 is coupled to a transmit-receive device 11 which is supplied by a transmitter 12 such as a magnetron. The output of the transmit-receive device 11 is coupled to a radar receiver 13 which supplies a video output. A 1 MHz. clock source 14 indexes a counter 15 which may count from zero to 399 and then recycle to zero again. For purposes of simplicity, I have shown counter 15 as providing only five outputs comprising the counts of zero through four. The 0 output of counter 15 excites transmitter 12 to provide an output pulse of, for example, 1 μsec. duration. Since clock source 14 has a frequency of 1 MHz. and since counter 15 provides 400 outputs, the pulse repetition frequency of transmitter 12 is 2,500 Hz. with a corresponding period of 400 μsec. between pulses.

The video output of receiver 13 is coupled through a 3.9 K resistor 16 to a plurality of input gates 20a, 20b, and 20c. The 1 output of counter 15 is not used, in order to afford a recovery period for the transmit-receive device 11. However, the 2, 3, and 4 outputs of counter 15 actuate respective gates 20a, 20b, and 20c. The outputs of gates 20 are coupled to ground through respective 130 pf. boxcar storage capacitors 17a, 17b, and 17c. The voltages across storage capacitors 17 are applied to respective band-pass filters 40a, 40b, and 40c which may have a pass band extending from 40 Hz. to an upper limit of 1,250 Hz. which is half the pulse repetition frequency. The outputs of Doppler filters 40 are applied to respective output gates 30a, 30b, and 30c. Output gates 30a through 30c are actuated by the respective 2, 3, and 4 outputs of counter 15. The outputs of gates 30 are coupled through respective 0.001 μf. capacitors 60a, 60b, and 60c, to one terminal of a 10 K resistor 61, the other terminal of which is grounded.

It will be appreciated that since recycling counter 15 provides 400 outputs, there will be provided some 398 range-gated channels, each including input gate 20, boxcar storage capacitor 17, band-pass filter 40, output gate 30, and output capacitor 60.

The output across resistor 61 is connected to the base of an NPN transistor 71 and to the base of a PNP transistor 72. The emitters of transistors 71 and 72 are grounded through a variable resistor 75. The collector of transistor 71 is coupled through a resistor 73 to a positive potential source 64. The collector of transistor 71 drives the base of a PNP transistor 76, the emitter of which is connected to positive source 64. The collector of transistor 72 is connected through a resistor 74 to a negative potential source 65. The collector of transistor 72 drives the base of an NPN transistor 77, the emitter of which is connected to negative source 65. The collector of transistor 77 is coupled through a variable resistor 78 to positive source 65. The collector of transistor 77 drives the base of a PNP transistor 79, the emitter of which is connected to positive source 64. The collectors of transistors 76 and 79 are grounded through a resistor 80 and are connected to an output terminal 82 which supplies the intensity input of a display device.

In operation of my invention, when counter 15 recycles from a count of 399 to zero, transmitter 12 provides a pulse which is coupled through device 11 and radiated from antenna 8. As will be appreciated by those skilled in the art, the antenna may be oscillated or rotated in azimuth. Radar return from targets is received by antenna 8 and coupled through device 11 to radar receiver 13. The video output of receiver 13 is applied to the boxcar storage capacitors 17 by the sequential actuation of gates 20 in response to the 2, 3, 4, ... outputs of counter 15. Capacitors 17 thus store a profile of the amplitude of radar return as a function of range. If a radar target exists at a given range, then the voltage stored in that one of capacitors 17 corresponding to such range will be a function not only of the radar return from the target but also of the background return from terrain at the same range. If the target moves against the background, then the composite background-target return will exhibit an amplitude variation at the Doppler frequency $F=2v./\lambda$, where $v$ is the radial velocity of the moving target and $\lambda$ is the wave length of pulses provided by transmitter 12. It is desired to distinguish between true moving targets and clutter produced, for example, by foliage swaying in moderate winds. The lower cutoff frequency at 40 Hz. of band-pass filters 40 sharply attenuates all clutter frequencies while passing the Doppler frequencies of even the slowest radar target of interest.

Accordingly, if a moving target exists at a given range, then that one of band-pass filters 40 corresponding to such range will provide an alternating-current output at the Doppler frequency. This alternating-current output is sampled by the corresponding output gate 30 and applied through the corresponding output gate 30 and applied through the corresponding capacitor 60 to a full-wave detector circuit comprising transistors 71 and 72. If the sampled output of a given band-pass filter 40 is positive, then transistor 71 is rendered conductive. This, in turn, renders transistor 76 conductive to provide a positive output across resistor 80 at output terminal 82. If the sampled output of a given band-pass filter 40 is negative, then transistor 72 is rendered conductive. This causes transistor 77 to conduct which, in turn, renders transistor 79 conductive; and a positive output is again produced across resistor 80 at output terminal 82. If the sampled output of a given band-pass filter is very small, then neither of transistors 71 and 72 will be rendered conductive; and the output at terminal 82 will remain at ground potential. The full-wave detection provided by transistors 71 and 72 thus causes a moving target to appear on the display device as a bright spot, the intensity of which rises and falls at twice the Doppler frequency. Since the minimum Doppler frequency is 40 Hz., the minimum rate of variation of intensity of the bright spot corresponding to a moving target will be 80 Hz. This frequency is appreciably greater than the maximum detectable flicker frequency of the human eye; and a moving target will appear on the display device as a bright spot of uniform illumination.

The threshold level of the full-wave detector may be varied by adjustment of resistor 75, a large value of resistance providing a high threshold and low sensitivity, and a small value of resistance providing a low threshold and high sensitivity. For airborne applications, the threshold level may be varied as a function of the azimuth angle of the antenna from the ground track to compensate for the increased clutter amplitude when looking to either side as compared with looking dead ahead.

Resistor 78 is adjusted to provide substantially equal sensitivity in the detection of positive and negative signals across resistor 61. Resistor 78 should be made sufficiently small that the total gain provided by transistors 72, 77, and 79 for negative input signals is reduced to that provided by transistors 71 and 76 for positive input signals. The amplitude detector is preferably direct-coupled, as shown, since the various stages will often be driven to saturation.

Figure 2:
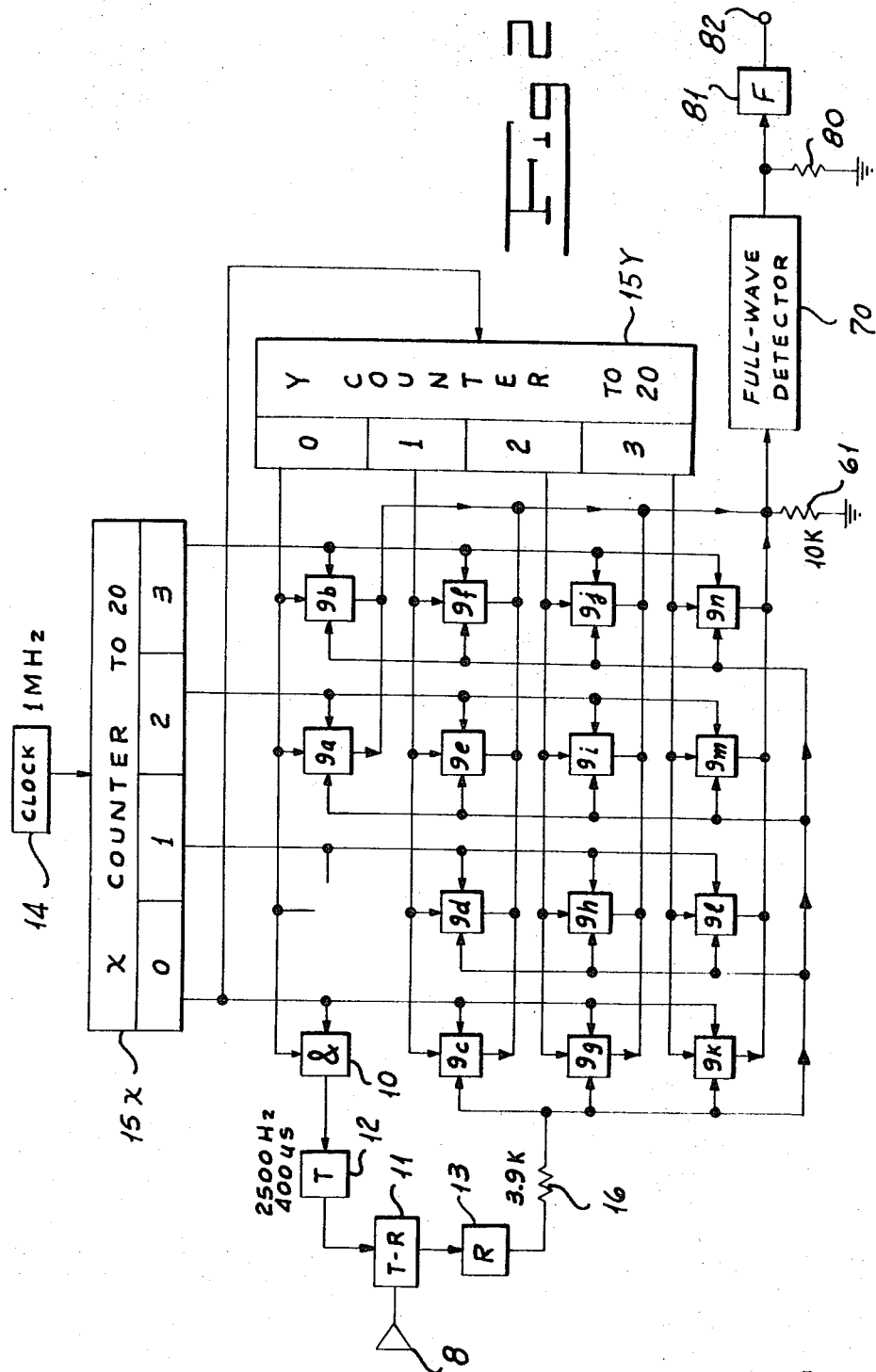
FIG. 2 is a simplified schematic view of another embodiment of my invention showing a matrix arrangement for each of the range-gated channels.

Referring now to FIG. 2, clock source 14 indexes an X counter 15X which may count from zero to 19 and then recycle to zero again. For purposes of simplicity, I have shown counter 15X as providing only four outputs comprising the counts of zero through three. The 0 output of counter 15X indexes a Y counter 15Y which may be of similar construction to counter 15X. The $X=0$, $Y=0$ outputs of counters 15 enable an AND-circuit 10 to excite transmitter 12. The $X=1$, $Y=0$ outputs of counters 15 are not used, in order to afford a recovery period for transmit-receive device 11. The $X=2$, $Y=0$ outputs of counters 15 enable the input and output gates of channel 9a. The $X=3$, $Y=0$ outputs of counters 15 enable the input and output gates of channel 9b. Similarly, the 1, 2, and 3 outputs of counter 15Y in conjunction with the outputs of counter 15X enable the input and output gates of channels 9c through 9n. The video output of receiver 13 is coupled through resistor 16 to the input gate of each of the channels; and output capacitor 60 of each of the channels is connected to output resistor 61, in the manner shown in FIG. 1. Resistor 61 is connected to the input of a full-wave detector 70 which provides an output across resistor 80, as shown in FIG. 1. In FIG. 2, the output of detector 70 across resistor 80 is applied to a single input flip-flop circuit 81 which may comprise a Schmitt trigger. Trigger circuit 81 provides an output at terminal 82 which again supplies the intensity input of a display device.

The operation of the circuit of FIG. 2 is similar to that of FIG. 1. Each time that counter 15X recycles from a count of 19 to zero, counter 15Y is indexed to a successively higher count. When counter 15Y provides a count of 19, the recycling of the X counter from a count of 19 to zero causes the Y counter likewise to recycle from a count of 19 to zero. When both counters recycle to zero, AND-circuit 10 provides an output which excites transmitter 12. Since each of counters 15X and 15Y provide twenty outputs, the total number of outputs provided by both counters is again 400. In FIG. 2, flip-flop 81 provides sharply defined outputs of a digital nature. As in FIG. 1, a moving target appears on the display device as a bright spot, the intensity of which rises and falls at twice the Doppler frequency. Again, the minimum flicker frequency variation in intensity of a moving target is 80 Hz. The threshold level in FIG. 2 may be adjusted by variation of resistor 75 (FIG. 1) or by adjustment of the threshold level of trigger circuit 81.

Referring now to FIG. 3, there are shown the details of one of the range-gated channels 9. Resistor 16 is connected to the cathode of a diode 22 and to the anode of a diode 23. The anode of diode 22 is connected forwardly through a diode 27 to a given one of the outputs of the X counter and is connected through a resistor 25 to a predetermined one of the outputs of the Y counter. Each of the X and Y counters provides complementary outputs which are of opposite polarity. The cathode of diode 23 is connected backwardly through a diode 28 to the complement (X') of such given one of the outputs of the X counter and is connected through a resistor 26 to the complement (Y') of such predetermined one of the outputs of the Y counter. The anode of diode 22 is serially connected through diodes 21 and 24 to the cathode of diode 23. Components 21 through 28 form the input gate 20 of FIG. 1. The junction of the cathode of diode 21 and the anode of diode 24 is connected through 130 pf. boxcar storage capacitor 17 to ground. Capacitor 17 is connected through an 11M resistor 41 to the gate of an n-channel field-effect transistor 43 which is preferably of the insulated-gate type as shown. The gate of transistor 43 is grounded through a 13 pf. capacitor 42. Components 41 and 42 comprise a low-pass filter having a cutoff frequency of 1,250 Hz. which attenuates higher frequencies at a roll-off rate of 6 db. per octave. The source of field-effect transistor 43 is coupled through a resistor 44 to negative voltage supply 65; and the drain of transistor 43 is connected to positive voltage supply 64. The source of field-effect transistor 43 is serially coupled through capacitors 45 and 47 to the base of an NPN emitter follower transistor 49, the collector of which is connected to positive source 64. The base of transistor 49 is grounded through a resistor 48. The emitter of transistor 49 is coupled through a resistor 46 to the junction of capacitors 45 and 47 and through a resistor 50 to negative source 65. Components 45 through 48 in conjunction with unity-gain emitter follower transistor 49 comprise an active high-pass filter having a cutoff frequency of 40 Hz. which attenuates lower frequencies at a rolloff rate of 12 db. per octave.

The emitter of transistor 49 is serially connected through capacitors 51 and 53 to the base of an NPN emitter follower transistor 56, the collector of which is connected to positive source 64. The base of transistor 56 is grounded through a resistor 54 and is connected through a biasing resistor 55 to positive source 64. The emitter of transistor 56 is coupled through a resistor 52 to the junction of capacitors 51 and 53 and through a resistor 57 to negative source 65. Components 51 through 54 in conjunction with the unity-gain of emitter follower transistor 56 form an active high-pass filter, having a cutoff frequency of 40 Hz. which attenuates lower frequencies at a rolloff rate of 12 db. per octave. Capacitors 45 and 51 may each have a value of 0.27 $\mu$f; resistors 46 and 52 may each have a value of 15K; and capacitors 47 and 53 may each have a value of 0.11 $\mu$f. Resistor 48 may have a value of 36K; and the parallel equivalent resistance of resistors 54 and 55 may also be 36K. I have assumed that the input resistance of emitter followers 49 and 56 is much larger than 36K, so that there is negligible loading of the outputs of the high-pass filters. With such values, each of the high-pass filters will have a maximally flat or Butterworth response. The emitter of transistor 56 is connected through a 10K resistor 58 to one terminal of a 0.013 $\mu$f capacitor 59, the other terminal of which is grounded. Components 58 and 59 form a low-pass filter having a cutoff frequency of 1,250 Hz. which attenuates higher frequencies at a rolloff rate of 6 db. per octave. Components 41 through 59 form a band-pass filter which attenuates frequencies less than 40 Hz. at a rolloff rate of 24 db. per octave and which attenuates frequencies greater than 1,250 Hz. at a rolloff rate of 12 db. per octave.

The output across capacitor 59 is connected to the cathode of diode 32 and the anode of diode 33. The anode of diode 32 is connected forwardly through a diode 37 to the given one of the outputs of the X counter and is connected through a resistor 35 to the predetermined one of the outputs of the Y counter. The cathode of diode 33 is connected backwardly through a diode 38 to the complement (X') of the given one of the outputs of X counter and is connected through a resistor 36 to the complement (Y') of the predetermined one of the outputs of the Y counter. The anode of diode 32 is serially connected through diodes 31 and 34 and to the cathode of diode 33. Components 31 through 38 form the output gate 30 of FIG. 1.

The junction of the cathode of diode 31 and the anode of diode 34 is connected through a 0.001 $\mu$f output capacitor 60 to one terminal of 10K resistor 61, the other terminal of which is grounded. The time-constant of resistor 61 and each of capacitors 60 is 10 $\mu$sec. Components 60 and 61 form a gated high-pass filter having a cutoff frequency of 40 Hz. which attenuates lower frequencies at a rolloff rate of 6 db. per octave.

In operation of the circuit of FIG. 3, input gate 20 is conductive only if both the X and Y counter inputs are positive and the corresponding complement counter inputs X' and Y' are negative. With such potentials applied, current will flow through resistor 25, diodes 21 through 24, and resistor 26, while diodes 27 and 28 will be backwardly biased. With diodes 21 through 24 thus conductive, the video input is coupled through resistor 16 to capacitor 17. The input gate 20 is rendered conductive for intervals of only 1 μsec. Resistor 16 and capacitor 17 have a time-constant of 0.5 μsec. which affords attenuation of any high-frequency noise in the video input signal but permits capacitor 17 to be charged to $1-e^{1}2=$ 86.5 percent of its equilibrium or steady state voltage. The voltage across capacitor 17 varies as a stepwise approximation to a sinusoid during each Doppler cycle. The band-pass filter comprising components 41 through 59 provides a very high skirt selectivity to attenuate clutter frequencies of less than 40 Hz. and provides a moderate skirt selectivity to attenuate frequencies greater than 1,250 Hz. especially the pulse repetition frequency of 2,500 Hz. Accordingly, the output across capacitor 59 is of substantially smooth sinusoidal wave form without the stepwise sampling discontinuities which appear across capacitor 17.

Output gate 30 is also rendered conductive in synchronism with input gate 20. Since there are 400 range-gated channels, capacitor 59 is coupled to capacitor 60 only 1/400 of the time. Components 60 and 61 function as a gated high-pass filter which is equivalent to a continuously driven high-pass filter having a time-constant of 400(10 μsec)=4,000 μsec and a cutoff frequency of 40 Hz. Since the pulse repetition frequency is 2,500 Hz., output gate 30 will be enabled in excess of 62 times during each Doppler cycle for frequencies of 40 Hz. and less. Thus the voltage produced across resistor 61 upon each enabling of output gate 30 will be substantially the same as that provided by a continuously driven high-pass filter having a time-constant of 4,000 μsec and a cutoff frequency of 40 Hz. The time-constant of capacitor 60 and resistor 61 is 10 μsec which is ten times the 1 μsec sampling period of output gate 30. Upon each enabling of output gate 30, the voltage across resistor 61 decreases slightly by $1-e^{1}0.1=9.5$ percent. Hence upon each enabling of output gate 30, the voltage across resistor 61 is substantially constant, exhibiting a variation of less than ±5percent.

Biasing resistor 55 raises the potential at the base of transistor 56 from ground to approximately +0.5 volt to compensate for a corresponding voltage drop in the base-to-emitter junction of transistor 56, so that the emitter of transistor 56 is substantially at ground potential in the absence of a Doppler input. Such construction partially neutralizes switching transients in output gate 30 caused by the junction capacitances of diodes 31 through 34 when backwardly biased. The large capacitance of capacitor 59 compared with the junction capacitances of diodes 31 through 34 provides a low impedance to output gate 30 when it is enabled, thus greatly reducing any residual switching transients. High-pass filter capacitor 60 blocks any unbalance in output gate 30, as well as any error in the biasing of output transistor 56. Accordingly, no individual bias adjustments are required for any of the range-gated channels. The additional high-pass filtering provided by output capacitor 60 in conjunction with resistor 61 further increases the skirt selectivity so that clutter frequencies less than 40 Hz. are attenuated with a rolloff rate of 30 db. per octave.

It will be seen that I have accomplished the objects of my invention. The outputs of the Doppler filters are directly applied to the output sampling gates. The output sampling gates are each connected through a gated high-pass filter to a common amplitude detecting circuit. While the amplitude detecting circuit preferably operates full-wave, it is sufficient that it operate half-wave since the minimum Doppler frequency of moving targets is usually appreciably greater than the maximum detectable flicker frequency of the human eye. The output of the amplitude detecting circuit may actuate the intensity input of a display device either directly or through a trigger circuit providing sharply defined outputs of a digital nature.

It will be understood that certain features and subcombinations are of utility and may be employed without reference to other features and subcombinations. It will be further obvious that various changes may be made in detail without departing from the spirit of my invention.

Having thus described my invention, what I claim is:

1. A range-gated moving target indicator including in combination a video input source, a plurality of input gates, means coupling the source to each input gate, a plurality of storage capacitors, means coupling each input gate to a corresponding storage capacitor, a plurality of Doppler filters, means coupling each storage capacitor to a corresponding Doppler filter, a plurality of output gates, means coupling each Doppler filter to a corresponding output gate, means for sequentially enabling each input gate in synchronism with a corresponding output gate, a common amplitude detecting circuit, and means coupling each output gate to the detecting circuit.

2. An indicator as in claim 1 wherein the enabling means comprises means for enabling each input gate for a predetermined period, wherein the means coupling the input source to the input gates comprises a resistor, and wherein the time-constant of the resistor and any one of the storage capacitors is of the order of magnitude of half said period.

3. An indicator as in claim 1 wherein each Doppler filter comprises a high-pass filter having a rolloff rate in the stop band of not less than 12 db. per octave.

4. An indicator as in claim 1 wherein the enabling means comprises means for periodically enabling each input gate at a predetermined repetition frequency and wherein each Doppler filter comprises a low-pass filter having a cutoff frequency of approximately half said repetition frequency.

5. An indicator as in claim 1 wherein each Doppler filter comprises a band-pass filter.

6. An indicator as in claim 1 wherein each Doppler filter comprises an active high-pass filter including an amplifier having a gain of substantially unity.

7. An indicator as in claim 1 wherein each Doppler filter comprises a shunt output capacitor of relatively large capacitance value.

8. An indicator as in claim 1 wherein each Doppler filter includes an output amplifier and means biasing the amplifier to provide a predetermined direct-current output.

9. An indicator as in claim 1 wherein the amplitude detecting circuit comprises a full-wave detector.

10. An indicator as in claim 9 wherein the construction of the full-wave detector is such as to provide substantially equal sensitivities for positive and negative half-cycles.

11. An indicator as in claim 1 wherein the detecting circuit has a certain threshold amplitude, the indicator further including means for varying the threshold of the amplitude detecting circuit.

12. An indicator as in claim 1 wherein the amplitude detecting circuit includes a trigger circuit.

13. An indicator as in claim 1 wherein the amplitude detecting circuit is direct-coupled.

14. An indicator as in claim 1 wherein the means coupling each output gate to the detecting circuit comprises a plurality of series output capacitors, means coupling each output gate to a corresponding output capacitor, means coupling each output capacitor to a common shunt resistor, and means coupling the shunt resistor to the detecting circuit.

15. An indicator as in claim 14 wherein each Doppler filter includes a high-pass filter having a certain cutoff frequency F, wherein the number of output gates is N, wherein the common shunt resistor and each of the series output capacitors comprises a gated high-pass filter, and wherein the time-constant T of the common shunt resistor and any one of the series output capacitors is such that $2\pi NTF$ is approximately equal to unity.

16. A range-gated moving target indicator including in combination a video input source, a plurality of range-gated channels, each channel comprising an input gate and a storage capacitor and a band-pass filter and an output gate, means coupling the source to the input gate of each channel, means for sequentially enabling the input gates of the channels in synchronism with the output gates thereof, a plurality of series output capacitors, means coupling each output gate to a corresponding output capacitor, a common amplitude detecting circuit, and means coupling each output capacitor to the detecting circuit.

17. An indicator as in claim 16 wherein the amplitude detecting circuit comprises a full-wave detector.

18. An indicator as in claim 16 wherein the detecting circuit has a certain amplitude threshold, the indicator further including means for varying the threshold of the amplitude detecting circuit.

19. An indicator as in claim 16 wherein the amplitude detecting circuit includes a trigger circuit.

20. An indicator as in claim 16 wherein each band-pass filter has a certain cutoff frequency F defining the lower limit of the pass band, wherein the number of range-gated channels is N, wherein the amplitude detecting circuit comprises a shunt input resistor, and wherein the time-constant T of said shunt input resistor and any one of the series output capacitors is such that $2\pi NTF$ is approximately equal to unity.